United States Patent [19]

Fishbein et al.

[11] 3,879,316

[45] Apr. 22, 1975

[54] POLYURETHANE FOAMS
[76] Inventors: John Fishbein; Raymond W. H. Bell; Anthony J. Clarke, all of c/o Fort Dunlop, Erdington, Birmingham 24, England
[22] Filed: Aug. 8, 1974
[21] Appl. No.: 495,780

Related U.S. Application Data
[63] Continuation-in-part of Ser. No. 417,193, Nov. 19, 1973, abandoned, which is a continuation of Ser. No. 4,057, Jan. 19, 1970, abandoned.

[30] Foreign Application Priority Data
Jan. 31, 1969 United Kingdom.................. 5455/69
Aug. 7, 1969 United Kingdom................ 39514/69

[52] U.S. Cl. ................260/2.5 AW; 260/2.5 AP; 260/2.5 AT
[51] Int. Cl... C08g 22/14; C08g 22/22; C08g 22/44
[58] Field of Search ..........260/2.5 AW, 77.5 NC, 260/2.5 AP, 2.5 AT

[56] References Cited
UNITED STATES PATENTS
2,978,449  4/1961  France .......................... 260/2.5 AW
3,252,942  5/1966  France .......................... 260/77.5 NC
3,745,134  7/1973  Fensch........................... 260/2.5 BF
3,803,064  4/1974  Fishbein ........................ 260/2.5 AM
3,832,311  8/1974  Windemuth .................... 260/2.5 AP FOREIGN PATENTS OR APPLICATIONS
908,337  10/1962  United Kingdom.......... 260/2.5 AW
843,841   8/1960  United Kingdom.......... 260/2.5 AW OTHER PUBLICATIONS
1965 Book of ASTM Standards, part 27, pages 538–541.
"Dabco–33LV Low Viscosity Solution," Noudry Process and Chem. Co., Technical Data Bulletin published 11–01–63, 3 pages.

*Primary Examiner*—Donald E. Czaja
*Assistant Examiner*—C. Warren Ivy
*Attorney, Agent, or Firm*—Stevens, Davis, Miller & Mosher

[57] ABSTRACT

Flame-resistant flexible polyurethane foams are obtained by reacting a poly(oxyethylene) poly(oxypropylene) polyol having primary hydroxyl groups with a polyisocyanate which is a polymer of tolylene disocyanate (TDI). The TDI polymer is normally a trimer of isocyanurate form which is conveniently used as a solution in TDI.

7 Claims, No Drawings

POLYURETHANE FOAMS

This application is a continuation-in-part of our application Ser. No. 417,193, filed Nov. 19, 1973 which is a continuation of application Ser. No. 4,057, filed Jan. 19, 1970, both applications are now abandoned.

This invention relates to polyurethane foams, especially flexible foams; and relates particularly to flame-resistant and coldcuring polyurethane foams, and to methods of making them.

Conventional polyurethane foams, particularly those derived from polyethers, have little inherent resistance to burning (flame resistance), and in view of the widespread use of polyurethane foams in mattresses, cushions and other upholstery there exists a demand for flame-resistant products. Previous proposals for reducing the inflammability of polyurethane foams have included the incorporation in the foam-forming reaction mixture of certain conventional flame retardants. However, these materials have either tended to be lost by evaporation during the foam-forming reaction or, if of sufficient molecular weight to preclude substantial loss by evaporation they have, because of their relatively high density, tended to concentrate in the lower regions of foam products during manufacture, especially where manufacture is by a continuous, free rise method producing a foam loaf. Consequently, in order to ensure that sufficient flame retardant is included in the upper regions of the loaf it has been necessary to incorporate in the foam-forming reaction mixture an amount of such conventional flame-retardant substantially in excess of that which would be required if the retardant could be distributed evenly throughout the foam loaf.

We have now found, according to the present invention, that excellent flame-resistant polyurethane foams can be obtained by reacting in a foam-forming reaction mixture a poly(oxyethylene poly(oxypropylene) polyol having terminal primary hydroxyl groups with a polymer of tolylene di-isocyanate (T.D.I.). Accordingly, the present invention provides a process for the production of a flame-resistant polyurethane foam, by the interaction in a foam-forming reaction mixture of a poly(oxyethylene) poly(oxypropylene) polyol having terminal primary hydroxyl groups with an organic polyisocyanate using carbon dioxide or other blowing agent, in which the polyisocyanate is a polymer of tolylene diisocyanate. In some cases the flame-resistant foams of this invention are in fact self-extinguishing under the test of British Standard Specification BS.2972.

The T.D.I. polymer is conveniently a trimer, and the description which follows is concerned principally with trimers. The trimerization products of T.D.I. are already known chemicals and believed to have an isocyanurate structure. Thus, for example, the product obtained by trimerization of tolylene 2,6-diisocyanate is believed to be, or at least to contain a substantial amount of, the isocyanurate of the formula:

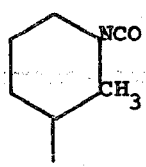

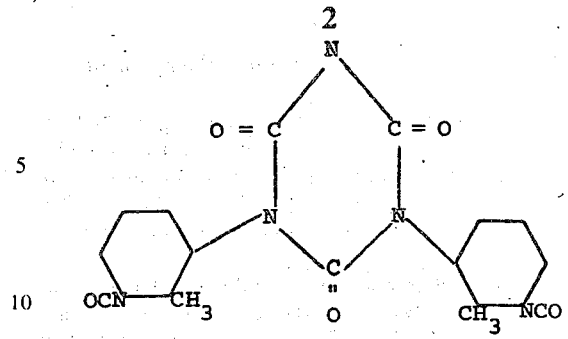

Trimerization of the 2,4-isomer is believed to lead to an appropriately similar isocyanurate.

It has been found convenient, for example, to incorporate the T.D.I. polymer in the foam-forming reaction mixture as a solution in T.D.I. A suitable mixture can be obtained by partial polymerization of T.D.I. The polyisocyanate polymerization product can contain, for instance, 60-90 percent by weight of unpolymerized T.D.I.

The isocyanurate should, preferably, not be too reactive with the other foam-forming reactants, with a view to the adoption, as far as possible, of conventional reaction conditions.

The invention is of particular use in the formation of low density foams (for example, 0.020–0.060 kg./m$^3$) for it is in such foams that the flame retardant effect is most pronounced.

Where T.D.I is referred to herein it can contain one or more isomers thereof. For example, it can be tolylene-2,4-diisocyanate, tolylene-2,6-diisocyanate, or a mixture thereof, for instance in the proportions 80:20 (80:20 T.D.I.) or 65:35 (65:35 T.D.I) by weight. The tolylene diisocyanate is conveniently used in an amount which provides the same amount of free isocyanate radicals as is available in conventional processes where tolylene diisocyanate is used as the polyisocyanate.

Any poly(oxyethylene-oxypropylene) polyol having terminal primary hydroxyl groups conventionally used for producing polyurethane foams may be used. The polyurethane foams can be obtained, by mixing the ingredients of the foam formulation as for conventional foams.

There is a tendency for the polyurethane foams of this invention to be obtained with closed cells. If desired, the closed cells can be opened, for example by compression between rollers.

It has been found that the use in the process of the invention of silicones, and in particular siloxane-oxyalkylene block copolymers, detract from the flame-resistant properties of the polyurethane foams obtained, as does the use of metal catalysts such as stannous octoate. A small proportion of a silicone such as that used in some of the Examples below is not objectionable but the amount used should preferably be not more than 0.1 percent by weight of the weight of the polyol. If a siloxane-oxyalkylene block copolymer is used it should preferably be in an amount less than 0.05 percent and preferably not more than 0.03 percent. If a metal catalyst such as stannous octoate is used it should preferably be in an amount of not more than 0.3 percent.

The polyurethane foams of the invention can be moulded by a cold-cure moulding method, that is, a method in which the foam-forming reaction mixture is moulded and allowed to cure without the application of heat.

The flame-resistant properties of the polyurethane foams of this invention can be enhanced by the incorporation of bromo compounds, organo halogen or organo-phosphorus compounds, for instance, 2,3-dibromo butene-1,4-diol or 4-chloro-m-phenylene diamine.

The invention is illustrated by the following Examples, in which flexible flame-resistant polyurethane foams are obtained by the one-shot or single stage method. The T.D.I. polymerization product was the product obtained by subjecting to polymerization conditions tolylene diisocyanate, and by infrared spectroscopy was shown to consist of 70 parts T.D.I., 15 parts of a T.D.I trimer in the form of the isocyanurate and 15 parts of more highly polymerized T.D.I. and believed to be of isocyanaurate structure.

In the Examples:

Propylan 555 is the condensation product of propylene oxide and ethylene oxide with glycerol having terminal hydroxyl groups of which from 60 to 70 percent are primary hydroxyl groups of 5000 molecular weight; Propamine A is a commercial N-dimethylethanolamine; Dabco 33LV is a commercial triethylene diamine catalyst composition, that is diazobicyclo-octane; and Silicone MS.200 is a commercial silicone oil having a viscosity of 5 centistokes, believed to be dimethyl siloxane homopolymer.

EXAMPLE 1

A flexible, free-rise polyurethane foam was obtained using the following formulation:

|  | Parts by Weight |
|---|---|
| Propylan 555 | 100.00 |
| Water | 3.50 |
| Triethylamine | 0.40 |
| Propamine A | 0.30 |
| Silicone MS.200 | 0.05 |
| TDI Polymerization Product | 50.70 |

The foam has a density of 0.031 kgs./cu.m. and was self-extinguishing according to BS.2972 (alcohol cup test), without and after-flame.

EXAMPLE 2

A flexible free-rise polyurethane foam was obtained using the following formulation:

|  | Parts by Weight |
|---|---|
| Propylan 555 | 100.00 |
| Water | 4.50 |
| Triethylamine | 0.40 |
| Propamine A | 0.30 |
| Silicone MS.200 | 0.05 |
| TDI Polymerization Product | 63.00 |

The foam had a density of 0.026 kgs./cu.m. and was self-extinguishing in the BS.2972 test, but with an after-flame time of 3–5 seconds.

Tested by A.S.T.M. D.1692, the foam was classified as self-extinguishing, having a burnt length of 5.1 cm., a burning time of 27.5 secs., and a burning rate of 11.4 cm./minute.

EXAMPLE 3

A further flexible free-rise polyurethane foam was obtained using the following formulation which included as an auxiliary flame-retardent, 2,3-dibrome butane diol (1:4):

|  | Parts by Weight |
|---|---|
| Propylan 555 | 100.00 |
| Water | 4.50 |
| Triethylamine | 0.40 |
| Propamine A | 0.30 |
| Silicone MS.200 | 0.05 |
| 2,3-dibromo butane-1,4-diol | 2.00 |
| TDI Polymerization Product | 64.40 |

The foam had a density of 0.026 kgs./cu.m. and was self-extinguishing according to BS.2972 (no after-flame). It was found that this foam was also self-extinguishing according to A.S.T.M. D.1692, having a burnt length of 6.3 cm., a burning time of 30 seconds and a burning rate of 12.4 cm./min.

EXAMPLE 4

A further flexible free-rise polyurethane foam was obtained using the following formulation which included as an auxiliary flame-retardant 4-chloro-m-phenylene diamine:

|  | Parts by Weight |
|---|---|
| Propylan 555 | 100.00 |
| Water | 4.50 |
| Triethylamine | 0.40 |
| Propamine A | 0.30 |
| Silicone MS.200 | 0.05 |
| 4-chloro-m-phenylene-diamine (M.C.P.D.) | 2.00 |
| TDI Polymerization Product | 66.20 |

The foam had a density of 0.026 kgs./cu.m. and was self-extinguishing according to BS.2972 (no after-flame).

Examples 5 and 6 which follow relate to the production of cold-cure mouldings of flexible polyurethane foam.

EXAMPLE 5

|  | Parts by Weight |
|---|---|
| Propylan 555 | 100.00 |
| Water | 3.00 |
| Triethylamine | 0.40 |
| Dabco 33LV | 0.40 |
| Silicone MS.200 | 0.05 |
| TDI Polymerization Product | 44.30 |

The polyurethane foam prepared in the above formulation was dispensed into a metal mould which had been pre-heated to 50°C. A close-fitting lid was clamped into place on the mould by toggle clamps and the mould left for 12 minutes without any application of heat. The moulded product was then removed from the mould. The product was of good quality and appearance and, once crushed to release closed cells, was very resilient. It had a density of 0.048 kgs./cu.m.

EXAMPLE 6

Example 5 was repeated but using the following formulation containing Arcton 11 (trichlorofluoro methane) blowing agent.

|  | Parts by Weight |
|---|---|
| Propylan 555 | 100.00 |
| Water | 3.00 |
| Triethylamine | 0.40 |

| | |
|---|---|
| Dabco 33LV | 0.40 |
| M.C.P.D. (4-chloro-m-phenylene diamine) | 2.00 |
| Arcton 11 | 10.00 |
| TDI Polymerization Product | 47.50 |

The flexible polyurethane moulding obtained was similar in properties to that obtained in Example 5, except that the density was 0.040 kgs./cu.m. and the indentation hardness was approximately 25 percent lower: 26.7 kgs., at 50 percent deflection.

The foam products of Examples 5 and 6 were selfextinguishing as tested under BS.2972 without any afterflame.

EXAMPLE 7

A flexible, free-rise polyurethane foam was obtained using the following formulation.

| | Parts by Weight |
|---|---|
| 5000 Molecular weight (M.Wt.) polyol (Propylan 555) | 100.00 |
| Water | 3.0 |
| Triethylamine | 0.4 |
| Dabco 33LV | 0.4 |
| *Isocyanurate solution in 80:20 TDI | 40.4 |

*This solution was a 20% solution by weight of the isocyanurate obtained from 80:20 T.D.I. dissolved in that T.D.I.

The resulting foam had a density of 0.030 kgs./m$^3$ and when a number of samples of the foam were tested under BS.2972 about half the samples were self-extinguishing. A control foam was produced from a similar formulation but containing no flame retardant and all the samples were found to be inflammable under BS.2972.

When the Example was repeated but using also 2 php of 4-chloro-m-phenylene diamine (C.P.D.) in the formulation the resulting foam was self-extinguishing under BS.2972.

We claim:

1. A flexible polyurethane foam having an improved flame resistance prepared by the process which comprises reacting in a reaction mixture containing a blowing agent (a) an organic polyisocyanate composition comprising a trimer of tolylene diisocyanate distributed in tolylene diisocyanate, the trimer constituting 10-40 percent by weight of the polyisocyanate composition, with (b) a poly(oxyethylene) poly(oxypropylene) polyol containing primary hydroxyl groups in an amount sufficient to render the foam self-extinguishing under A.S.T.M.D. 1692.

2. The product of claim 1 wherein the density of the foam is from about 0.02 to 0.06 g./cc.

3. The product of claim 1 wherein the said reaction mixture is placed in a mold and allowed to cure without application of heat to the mold or its contents.

4. The product of claim 1 wherein the polyol used to make the product had a molecular weight of about 5,000 and had been prepared by condensing propylene oxide with glycerine and by condensing the resulting product with ethylene oxide.

5. The product of claim 1 wherein the polyol was prepared by condensing glycerine with propylene oxide and condensing the resulting product with ethylene oxide until a molecular weight of about 5,000 was reached and the polyol contained from about 60 percent to about 70 percent primary hydroxyl groups.

6. The product of claim 1 prepared by reaction of a mixture containing some but not more than 0.5 percent by weight silicone.

7. The product of claim 1 wherein some but less than 0.3 percent metal catalyst is included in the reaction mixture which produces the foam.

* * * * *